US00RE40757E

(19) United States
(12) Reissued Patent
Covatch

(10) Patent Number: US RE40,757 E
(45) Date of Reissued Patent: Jun. 23, 2009

(54) METATARSAL PROTECTOR

(75) Inventor: Charles E. Covatch, Martinsburg, PA (US)

(73) Assignee: Columbia Insurance Company, Omaha, NE (US)

(21) Appl. No.: 11/029,250

(22) Filed: Jan. 4, 2005

Related U.S. Patent Documents

Reissue of:
(64) Patent No.: 6,618,962
Issued: Sep. 16, 2003
Appl. No.: 09/686,546
Filed: Oct. 11, 2000

(51) Int. Cl.
*A43B 7/32* (2006.01)

(52) U.S. Cl. ..... 36/72 R; 36/96; 36/71
(58) Field of Classification Search ..... 36/96, 36/136, 77 R, 71, 72 R, 72 A
See application file for complete search history.

(56) References Cited

U.S. PATENT DOCUMENTS

| | | | | | |
|---|---|---|---|---|---|
| 2,829,449 | A | * | 4/1958 | Edwards et al. | 36/72 R |
| 2,915,837 | A | * | 12/1959 | Schlecht | 36/72 R |
| 2,972,824 | A | * | 2/1961 | Schlecht | 36/72 R |
| 2,988,829 | A | * | 6/1961 | Johnsen | 36/72 R |
| 3,101,559 | A | * | 8/1963 | Smith | 36/72 R |
| 3,108,386 | A | * | 10/1963 | MacQuaid | 36/72 R |
| 3,178,836 | A | * | 4/1965 | Turner | 36/72 R |
| 3,685,176 | A | * | 8/1972 | Rudy | 36/71 |
| 3,841,004 | A | * | 10/1974 | Gray et al. | 36/72 R |
| 3,995,382 | A | * | 12/1976 | Smith | 36/72 R |
| 3,997,983 | A | * | 12/1976 | Terhoeven | 36/72 R |
| 4,102,062 | A | * | 7/1978 | Adams | 36/72 R |
| 4,231,170 | A | * | 11/1980 | Griswold | 36/72 R |
| 4,342,159 | A | * | 8/1982 | Edwards | 36/77 R |
| 4,908,963 | A | * | 3/1990 | Krajcir et al. | 36/77 R |
| 5,457,898 | A | * | 10/1995 | Fortin et al. | 36/72 R |
| 5,513,450 | A | * | 5/1996 | Aviles Palazzo | 36/71 |
| 5,701,688 | A | * | 12/1997 | Crowley | 36/72 R |
| 5,711,092 | A | * | 1/1998 | Despres et al. | 36/72 R |
| 5,765,297 | A | * | 6/1998 | Cooper et al. | 36/72 R |
| 5,878,511 | A | * | 3/1999 | Krajcir | 36/77 R |
| 6,161,313 | A | * | 12/2000 | Bisson | 36/72 R |
| 6,170,174 | B1 | * | 1/2001 | Gesso | 36/72 R |
| 6,618,962 | B1 | | 9/2003 | Covatch | |

FOREIGN PATENT DOCUMENTS

| | | |
|---|---|---|
| BE | 522514 | 11/1955 |
| CH | 571834 | 1/1976 |
| DE | 1 103 811 | 3/1961 |
| DE | 24 26 727 | 3/1961 |
| DE | 25 36 443 | 2/1977 |

* cited by examiner

*Primary Examiner*—Marie Patterson
(74) *Attorney, Agent, or Firm*—St. Onge Steward Johnston & Reens LLC

(57) ABSTRACT

Footwear for protecting a wearer's foot includes an upper an upper that defines an opening for receiving a wearer's foot and an outsole attached to the upper, the upper further including a vamp having a proximal and a distal region, an elastic instep guard positioned on an instep portion of the upper to protect a metatarsal region of the foot, the elastic instep guard extending from the distal region to the proximal region of the vamp which is attached to the toe portion of the steel toe. The instep guard has a plurality of hollow passages.

20 Claims, 3 Drawing Sheets

METATARSAL PROTECTOR

Matter enclosed in heavy brackets [ ] appears in the original patent but forms no part of this reissue specification; matter printed in italics indicates the additions made by reissue.

*RELATED APPLICATIONS*

*This is a Reissue patent application of U.S. Pat. No. 6,618,962 issued Sep. 16, 2003.*

TECHNICAL FIELD

This invention relates to footwear, and more particularly to safety footwear.

BACKGROUND

In harsh and dangerous environments (e.g., construction and lumber operations), workers often wear heavy-duty work shoes or work boots to protect their feet from injury as well to provide comfort and support. Indeed, the Occupational Safety and Health Administration has set forth regulations for the types of work boots and work shoes to be used by workers in certain occupations including construction and mining.

Work boots and work shoes used in such environments typically have soles and uppers fabricated of heavier and durable materials. In certain environments, additional protective features may be constructed within the work boot or work shoe. For example, where there is a risk of heavy articles being dropped on the wearer's foot, steel toes, metatarsal guards, and puncture-proof covers are typically incorporated into or over the upper. Similarly, in high voltage environments, thicker and higher dielectric materials are used in fabrication of the soles of the work boots and work shoes.

SUMMARY

In a general aspect of the invention, an instep guard for use in footwear to protect the metatarsal region of the a foot includes an elastic support having hollow passages, and a shape and size commensurate with the instep section of the footwear.

In another general aspect of the invention, footwear for protecting a foot includes an upper defining an opening for receiving a wearer's foot and an outsole attached to the upper, the upper further including an instep guard positioned at an instep portion and having the features described above.

Embodiments of the invention may include one or more of the following features. The instep guard includes a sheet and a plurality of support members extending from the sheet to define the hollow passages, which are filled with air. The elastic sheet and the support members define at least some of the hollow passages. The hollow passages are elongated and at least one of the passages has a cross-section that is circular, ovoid, or triangular in shape. The support members may define two different types of hollow passages, one of which has a cross section of a first shape and the other of which has a second cross section shape. The instep guard further includes a second sheet attached to the first sheet by the support members. The instep guard may be formed of a flexible, resilient material such as rubber.

The instep guard is positioned on an underside of the instep portion of the footwear. For example, a liner is positioned beneath the instep portion of the footwear and the instep guard is then positioned on the underside of the instep portion by sewing the liner to the instep portion around the instep guard. The footwear further includes a steel toe positioned on a toe portion of the upper, and the instep guard is attached to the toe portion.

Among other advantages, the instep guard protects the metatarsal region of the foot from blows or forces that could, otherwise, injure the foot. The elastic nature of the instep guard and the air-filled channels make the footwear comfortable to the wearer. The instep guard provides sufficient protection against impacts that a wearer may be subjected to in a harsh environment.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
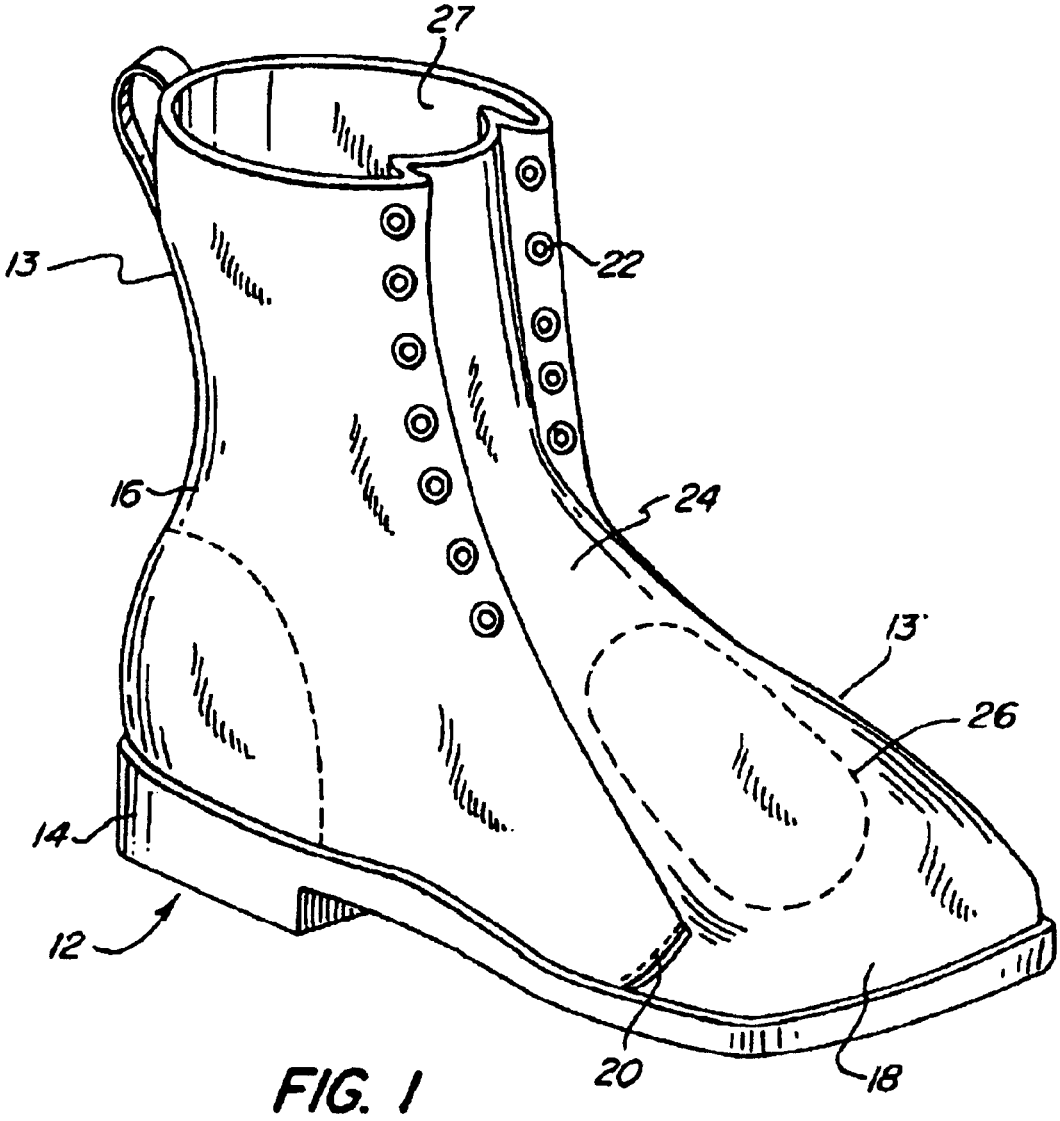
FIG. 1 is a perspective view of protective footwear having an instep guard positioned in an instep portion of the footwear.

Referring to FIG. 1, a shoe 12 for protecting a foot includes an upper 13 having a quarter 16 and a vamp 18 attached together with stitching 20. Vamp 18 and quarter 16 may be constructed from a durable material, such as leather. An outsole 14 is attached to the upper 13 using conventional lasting techniques. Vamp 18 covers a front part of the foot, while quarter 16 covers a rear part of the foot. Vamp 18 has eyelets 22 for receiving conventional front lacing (not shown) and a tongue 24 for protecting the foot from the front lacing. Quarter 16 and vamp 18 together define an opening 27 of the upper 13 for receiving the foot.

Vamp 18 has an instep portion 26 that covers the metatarsal region of the wearer's foot when the shoe is worn. As will be described below in greater detail, shoe 12 includes an instep guard 40 (FIG. 2) that is positioned with the instep portion 26 to protect the metatarsal section of the foot, for example, from inadvertent blows or forces.

Figure 2:
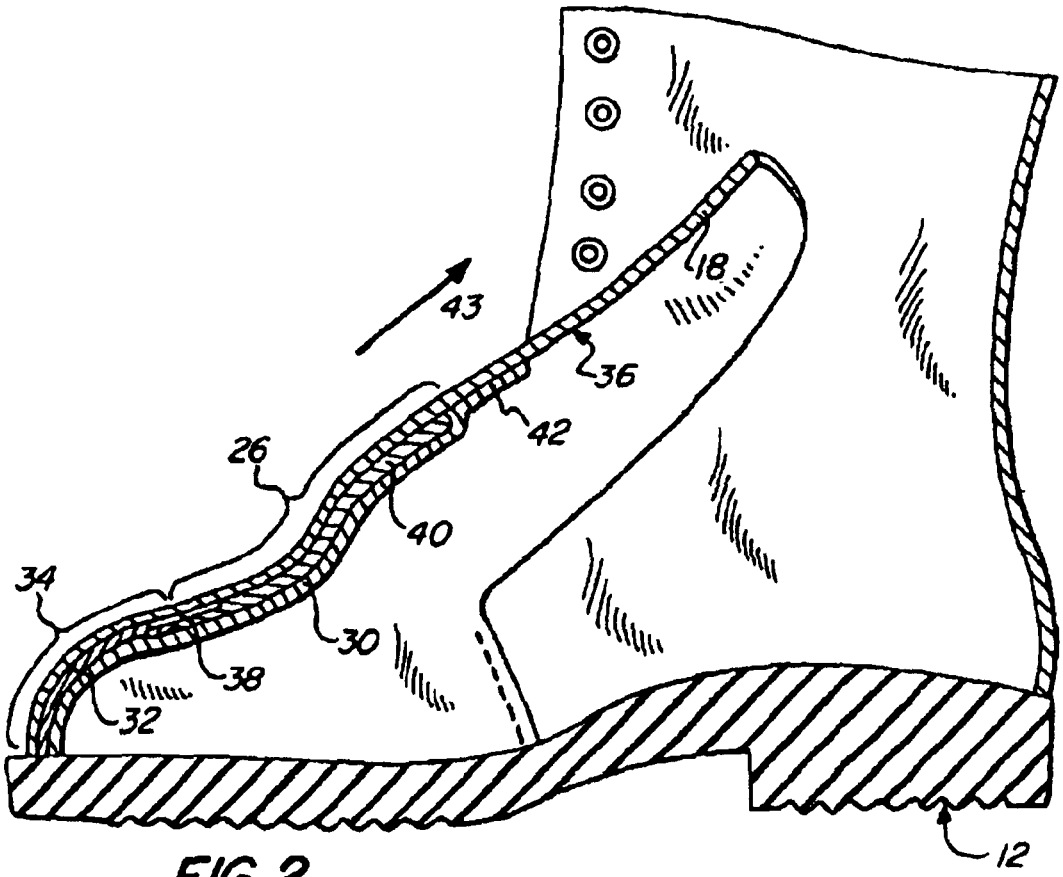
FIG. 2 is a vertical cross-section of the footwear of FIG. 1.

Referring to FIG. 2, shoe 12 also includes instep guard 40, a lining 30, and a steel toe 32. Steel toe 32, which protects the wearer's toe region, is attached to a toe portion 34 of an underside 36 of the vamp 18, for example, using glue. Tape 38 adheres the instep guard 40 to the steel toe 32, thereby positioning the instep guard 40 on instep portion 26 of the underside 36 of the vamp 18. The instep guard 40 is further held in place by stitching 42 surrounding instep guard 40, which attaches lining 30 to the underside 36 of the vamp 18. In this manner, instep guard 40 is sandwiched between the lining 30 and the vamp 18 and maintained in position along the underside 36 of the vamp 18 to protect the metatarsal region of the foot from inadvertent blows or forces.

Figure 3:
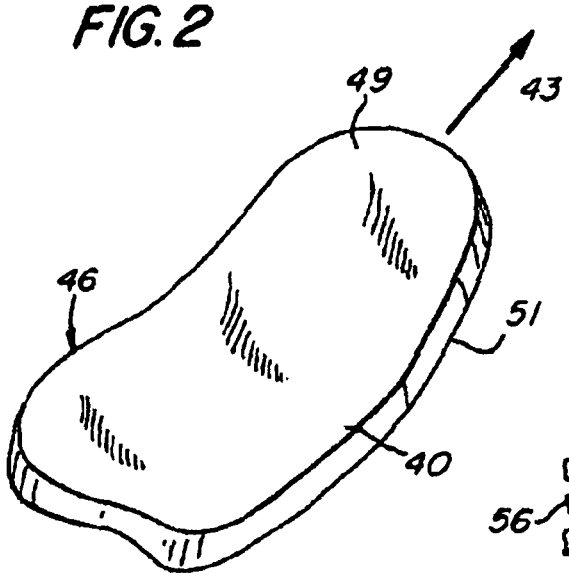
FIG. 3 is a perspective view of the instep guard of FIG. 1.

Referring to FIG. 3, the instep guard 40 is a generally planar member that is large enough to cover and protect the instep portion 26 of the shoe 12. The instep guard 40 is formed from an elastic material, such as rubber or a suitable synthetic material, which is sufficiently compliant to provide comfort to the foot but is elastic enough to provide protection to the metatarsals of the foot. In certain instances, the instep guard may be shaped to only cover the instep portion 26 of the shoe 12, as shown in FIG. 3, to make the shoe 12 more comfortable. In these instances, the instep guard 40 may have an avoid shape and may be elongated along an axis 43 of the foot to match the shape of the instep portion 26 of the shoe. The thickness of the guard is chosen to provide the necessary protection without making the shoe uncomfortable. For example, the guard may be a quarter of an inch thick, 4 inches long and 3 inches wide. The elastic material of the guard has channels running through it to provide better comfort and protection as described below with references to FIG. 4.

Figure 4:
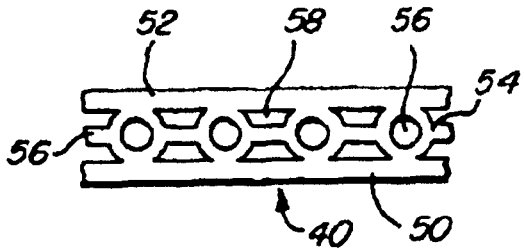
FIG. 4 is a cross-section view of the instep guard of FIG. 3.

Referring to FIG. 4, instep guard 40 is formed to include hollow channels 56, 58 that absorb shock to the feet without sacrificing comfort. In particular, instep guard 40 includes a first planar sheet 50 and a second planar sheet 52, with curved support members 54 extending between the planar sheets 50, 52 to define elongated hollow channels 56 with circular cross-sections. The channels extend through the instep guard 40, for example, along the axis 43 of the foot. Cross pieces 55 join convex surfaces of adjacent curved members. Each cross piece 55, defines an elongated hollow channels 58 with each planar sheet 50, 52 and the corresponding curved members 54. The hollow channels 58 each have a substantially trapezoidal cross-section. Thus the instep guard 40 defines parallel air-filled channels aligned along the axis 43 of the foot to provide protection from inadvertent blows or forces to the metatarsals of the foot without making the shoe uncomfortable.

Figure 5A:
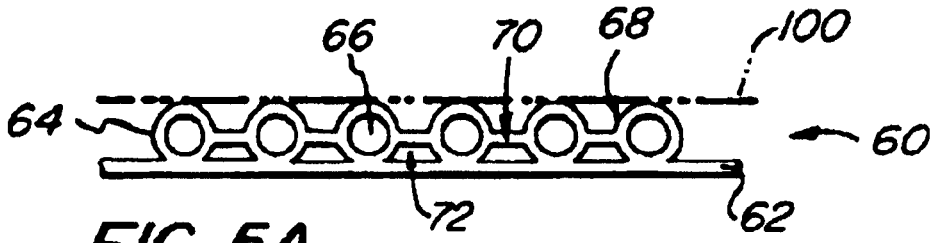
FIGS. 5A–5C are cross-sectional views of alternative embodiments of the instep guard of FIG. 3.

Referring to FIG. 5A, a first alternative embodiment of the instep guard 60 has a single planar sheet 62 with curved support members 64 extending form the planar sheet 62 to define circular air-filled channels 66. Concave surfaces 68 of the support members 64 are joined by cross pieces 70 to define air-filled channels 72 with substantially trapezoidal cross-sections.

Figure 5B:
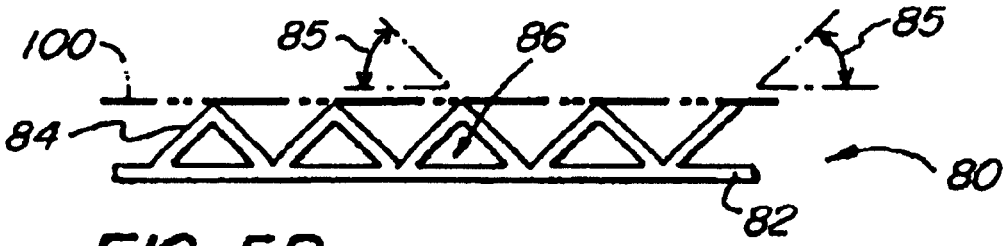

Referring to FIG. 5B, a second alternative embodiment of the instep guard 80 that has a single planar sheet 82. Planar support members 84 extend from the planar sheet 82 at an angle 85 (such as 60°) to define elongated channels 86 with triangular cross-sections.

Figure 5C:
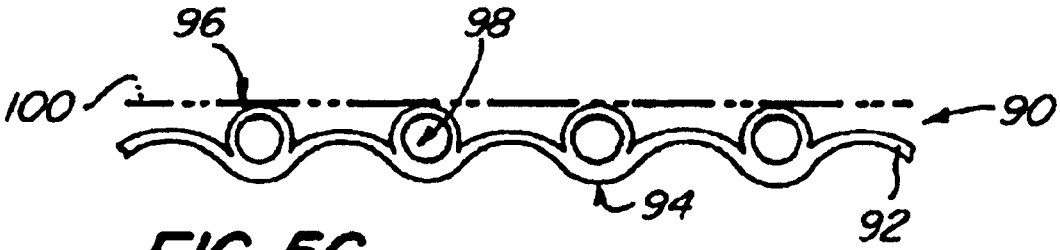

Referring to FIG. 5C, a third alternative embodiment of the instep guard 90 includes an undulating sheet 92 defining furrows 94. Curved support members 96 extend from the furrows 94 to define elongated channels 98, which have ovoid cross-sections. In all three alternate embodiments, it is preferable to have a second sheet 100 connected to the first sheet 62, 82, 92 by the support members 64, 84, 96. However, the second sheet may be omitted in certain applications.

A number of embodiments of the invention have been described. Nevertheless, it will be understood that various modifications may be made without departing from the spirit and scope of the invention. For example, the air-filled channels may have any shape or configuration so long as they provide the necessary protection to metatarsals. For example, they need not be parallel or elongated. Similarly, the instep guard does not have the same shape as the instep portion of the shoe 12. For example, it could be larger than the instep portion so long as it provides protection to the instep portion. The instep guard may be used with a shoe that does not include a steel toe.

Accordingly, other embodiments are within the scope of the following claims.

What is claimed is:

1. Footwear for protecting a foot, comprising:

a vamp of an upper extending from a toe portion to an instep portion;

a liner positioned beneath said instep portion;

a steel toe positioned beneath said toe portion;

an elastic guard positioned between said instep portion and said liner and including a plurality of hollow passages; and said elastic instep guard is in direct contact with said steel toe and extends from said steel toe toward said instep portion for providing continuous protection to the foot.

2. The footwear of claim 1, wherein the instep guard includes:

a first sheet; and a plurality of support members extending from the first sheet to define the plurality of the hollow passages.

3. The footwear of claim 2, wherein the instep guard further comprises a second sheet connected to the first sheet by the support members.

4. The footwear of claim 1, wherein at least some of the plurality of [holes] *passages* are defined by the first sheet and support members.

5. The footwear of claim 1, wherein the hollow passages are filled with air.

6. The footwear of claim 1, wherein the hollow passages are elongated.

7. The footwear of claim 1, wherein at least one of the elongated hollow passages has cross-section that is either circular, ovoid, or triangular in shape.

8. The footwear of claim 1, wherein the *plurality of* support members define a first type of elongated passage with a first cross-section shape and a second type of elongated passage with a second cross-section shape.

9. The footwear of claim 1, wherein the instep guard includes a resilient material.

10. The footwear of claim 1, wherein the instep guard is positioned on an underside of the instep portion of the footwear.

*11. Footwear for protecting a foot, comprising:*

*a toe of the footwear;*

*a vamp of an upper extending from said toe to an instep portion;*

*a liner positioned beneath said instep portion;*

*an elastic guard positioned between said instep portion and said liner and including a plurality of hollow passages;*

*said elastic instep guard is in direct contact with said toe and extends from said toe toward said instep portion for providing continuous protection to the foot; and*

*wherein the instep guard includes:*

*a first sheet; and*

*a plurality of support members extending from the first sheet to define the plurality of the hollow passages.*

*12. The footwear of claim 11 wherein the instep guard further comprises a second sheet connected to the first sheet by the support members.*

*13. The footwear of claim 11 wherein the hollow passages are filled with air.*

*14. The footwear of claim 11 wherein the hollow passages are elongated.*

*15. The footwear of claim 11 wherein at least one of the plurality of hollow passages has cross-section that is either circular, ovoid, or triangular in shape.*

*16. The footwear of claim 11 wherein the instep guard includes a resilient material.*

*17. The footwear of claim 11 wherein the instep guard is positioned on an underside of the instep portion of the footwear.*

*18. Footwear for protecting a foot, comprising:*

*a toe of the footwear;*

*a vamp of an upper extending from said toe to an instep portion;*

*a liner positioned beneath said instep portion;*

*an elastic guard positioned between said instep portion and said liner and including a plurality of hollow passages;*

*said elastic instep guard is in direct contact with said toe and extends from said toe toward said instep portion for providing continuous protection to the foot; and*

*wherein at least some of the plurality of passages are defined by a first sheet and support members.*

*19. Footwear for protecting a foot, comprising:*

*a toe of the footwear;*

*a vamp of an upper extending from said toe to an instep portion;*

*a liner positioned beneath said instep portion;*

*an elastic guard positioned between said instep portion and said liner and including a plurality of hollow passages;*

*said elastic instep guard is in direct contact with said toe and extends from said toe toward said instep portion for providing continuous protection to the foot; and*

*wherein the plurality of support members define a first type of elongated passage with a first cross-section shape and a second type of elongated passage with a second cross-section shape.*

*20. Footwear for protecting a foot, comprising:*

*a toe of the footwear;*

*a vamp of an upper extending from said toe to an instep portion;*

*a liner positioned beneath said instep portion;*

*an elastic guard positioned between said instep portion and said liner and including a plurality of hollow passages;*

*said elastic instep guard is in direct contact with said toe and extends from said toe toward said instep portion for providing continuous protection to the foot; and*

*wherein said toe is a steel toe.*

* * * * *